(12) United States Patent (10) Patent No.: US 9,018,525 B1
Shotey (45) Date of Patent: Apr. 28, 2015

(54) WIRING DEVICES WITH GRADUATED INDICATORS

(71) Applicant: Hubbell Incorporated, Shelton, CT (US)

(72) Inventor: Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/140,210

(22) Filed: Dec. 24, 2013

Related U.S. Application Data

(60) Provisional application No. 61/745,728, filed on Dec. 24, 2012.

(51) Int. Cl.
*H01H 9/02* (2006.01)
*H02G 3/18* (2006.01)

(52) U.S. Cl.
CPC ...................................... *H02G 3/18* (2013.01)

(58) Field of Classification Search
USPC .................. 174/480, 481, 50, 53, 57, 58; 220/3.2–3.9, 4.02
See application file for complete search history.

(56) References Cited

U.S. PATENT DOCUMENTS

| 4,612,412 | A | * | 9/1986 | Johnston | 174/57 |
| 5,073,681 | A | * | 12/1991 | Hubben et al. | 174/66 |
| 5,189,259 | A | * | 2/1993 | Carson et al. | 174/66 |
| 5,594,207 | A | * | 1/1997 | Fabian et al. | 174/53 |
| 6,057,509 | A | * | 5/2000 | Simmons | 174/53 |
| 6,566,600 | B1 | * | 5/2003 | Ford et al. | 174/50 |
| 7,456,358 | B2 | * | 11/2008 | Swiencicki et al. | 174/66 |
| 7,456,360 | B2 | * | 11/2008 | Schmieta et al. | 174/66 |

* cited by examiner

*Primary Examiner* — Angel R Estrada
(74) *Attorney, Agent, or Firm* — George M. Macdonald

(57) ABSTRACT

Systems and methods for providing electrical wiring devices having off-center installation capabilities are described. An electrical wiring device has at least one elongated mounting hole for accepting a mounting fastener in more than one location. For example, an electrical wiring device such as a single-gang, double 15A outlet device may have an installation ear at each of the upper and lower ends of the device, wherein each of the installation ears contains an elongate hole for accepting a fastener such as a screw in more than one position. Additionally, each installation ear includes include markings adjacent to the elongate holes to mark installation positions such as left, center and right that facilitate off-center installation.

9 Claims, 2 Drawing Sheets

WIRING DEVICES WITH GRADUATED INDICATORS

CROSS REFERENCE TO RELATED APPLICATIONS

This application claims priority under 35 U.S.C. §119(e) to U.S. provisional patent application No. 61/745,728, entitled WIRING DEVICES WITH GRADUATED INDICATORS by Shotey, filed Dec. 24, 2012 which is hereby incorporated by reference in its entirety.

FIELD OF THE INVENTION

The illustrative embodiments described in the present application are useful in systems including those for installing electrical wiring devices and more particularly are useful in systems including electrical wiring devices having installation angle indicator markings such as graduated line indicators.

BACKGROUND

Electrical wiring devices are installed every day in various types of building installations, for example, industrial, residential and commercial applications and settings. The electrical devices may be installed in walls as single units or as multiple units in gang boxes. The proper alignment and orientation of the electrical devices can be time-consuming and tedious for an installer. In some instances, the installation location may not be plumb or straight which causes alignment issues with the installation of the electrical devices. Also, the multi-gang boxes that are installed to house the electrical devices may have been installed at an angle or not parallel to a stud in the wall.

Accordingly, there is a need, among other needs, for electrical wiring devices providing for ease of installation for off center installation applications.

SUMMARY

The present application describes illustrative embodiments of systems and methods for providing electrical wiring devices having off-center installation capabilities. In at least one illustrative embodiment, an electrical wiring device has at least one elongated mounting hole for accepting a mounting fastener in more than one location. For example, an electrical wiring device such as a single-gang, double 15A outlet device may have an installation ear at each of the upper and lower ends of the device. Here, each of the installation ears contains an elongate hole for accepting a fastener such as a screw in more than one position. Additionally, each installation ear may include markings adjacent to the elongate holes to mark installation positions such as left, center and right. In alternatives, other electrical devices may be utilized. In yet other alternatives, two or more than three markings may be used with each of the installation ears or the installation elongate hole(s) may be located in a different portion of the electrical device such as in the center.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The illustrative embodiments of the present application describe systems and methods for systems and methods for providing electrical wiring devices having off-center installation capabilities. In certain illustrative embodiments, the systems and methods are useful in systems including those for providing off-center installation in a multi-gang wall box that is not plumb to a wall stud such as a wall box installed at a 1 degree angle.

In one illustrative example, an electrical wiring device has at least one elongated mounting hole for accepting a mounting fastener in more than one location. For example, an electrical wiring device such as a single-gang, double 15A outlet device may have an installation ear at each of the upper and lower ends of the device. Here, each of the installation ears contains an elongate hole for accepting a fastener such as a screw in more than one position. Additionally, each installation ear may include markings adjacent to the elongate holes to mark installation positions such as left, center and right. In alternatives, other electrical devices may be utilized. In yet other alternatives, two or more than three markings may be used with each of the installation ears or the installation elongate hole(s) may be located in a different portion of the electrical device such as in the center.

The illustrative embodiments described in this instant application include an electrical wiring device having graduated indicators to aid an installer in the process of installing the electrical device. Additionally, methods of installing an electrical wiring device using the graduated indicators are described.

Figure 1:
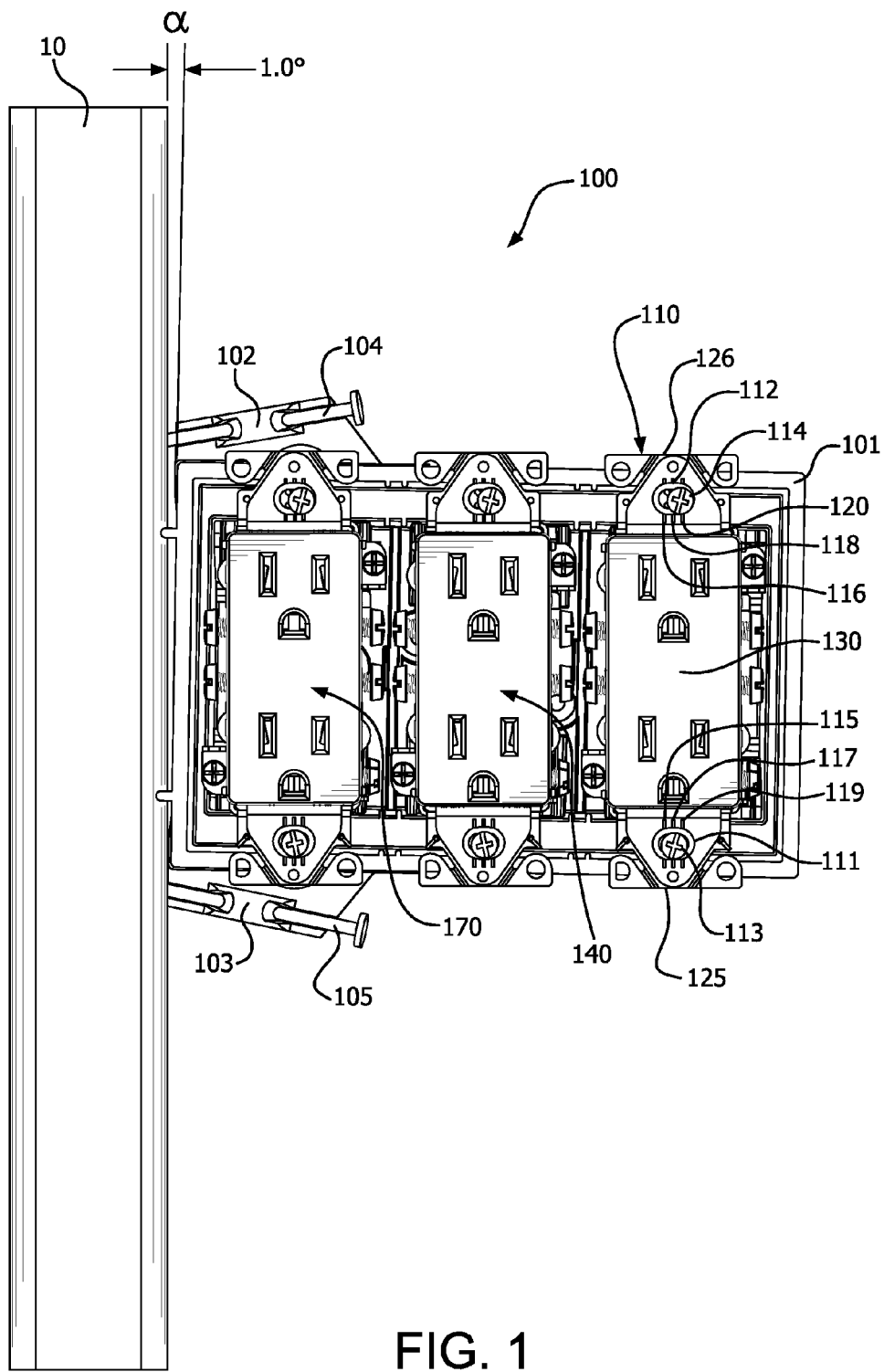
FIG. 1 is a front plan view of a representative electrical device installation according to an illustrative embodiment of the present application.

Referring to FIG. 1, a front plan view of a representative electrical device installation 100 according to an illustrative embodiment of the present application is shown. A vertical stud 10 in a wall with a multi-gang box 101 of three electrical devices 110, 140, 170 mounted to it. As shown, the multi-gang box 101 is not properly installed to the vertical stud 10; the top of the box is 1 degree off of vertical shown as angle alpha.

The graduated indicators shown in FIG. 1 are implemented as a set of three parallel spaced vertical lines 116, 118, 120 in the region of the top mounting screws 114 and three parallel spaced vertical lines 115, 117, 119 in the region of the bottom mounting screws 113 on each electrical device 110, 140, 179. These indicators are marks that are imprinted in the device yoke or ear 125, 126 to aid in placing the devices in plumb and parallel positions. The indicator lines may also include actual dimensions or angle measurements to add greater detail and precision to the alignment process during installation. The number and style of lines can be greater or lesser in number and size and shape. Multi-gang box 101 includes a top mount 102 with nail 104 and a bottom mount 103 with nail 105.

As shown in FIG. 1, the multi-gang box 101 of three electrical devices 110, 140, 170 has been installed onto a vertical stud 10 in a wall at an angle of 1 degree off of vertical angle alpha. As a result, the three electrical devices, which were installed into the multi-gang box, are also at an angle off of vertical. This angle will not give a proper appearance of the electrical devices and the wall plate that will cover them if left at this angle. Thus, the installer may use the apparatus and method of this application to correct this problem. This method and apparatus may be especially useful when a multi-gang box 101 is installed at an angle such as this. In order to have the electrical devices appear vertical and properly installed, the installer may use the graduated indicator lines shown on the electrical devices in FIG. 1.

For example, with reference to representative electrical device 110 having dual 15A sockets 130, a mounting screw 113 at the bottom of the electrical device 111 could be tightened down in elongated hole 111 of ear 125 enough to allow the installer to use it as a pivot point of the electrical device 110 for making the adjustment to the top of the electrical device to orient it vertically with respect to the stud in the wall and correct for the angled installation of the multi-gang box. Alternatively, the top screw 114 could be tightened down in elongated hole 112 of ear 126 to act as the pivot point for making the correction adjustments needed by adjusting the bottom portion of the electrical device. The graduated indicator lines can thus be used to easily keep track of the relative position of the electrical device. The graduated indicators can also show the relative positions of each electrical device in a multi-gang box relative to other electrical devices in the box.

As shown in FIG. 1, the bottom mounting screws 113 are positioned horizontally (from left to right 115, 117, 119) in a middle location 117 on the center graduated indicator line. They are also vertically positioned slightly lower than the center of the graduated indicator line. This positioning can be adjusted as needed to achieve the proper installation alignment of the electrical devices. The top mounting screws 114 are all shown in a horizontal position relatively right of center 120 to correct for the 1 degree of angle in the mounting of the multi-gang box on the vertical stud. Aligning the top of the electrical device mounting screw near the rightmost graduated indicator line 120 counteracts the angular mounting defect and corrects the vertical alignment of the electrical device relative to the vertical stud 10.

As just described, angular adjustments can be made to correct angular defects in the installation. However, adjustments to correct for horizontal and vertical problems in the installation can, of course, also be made. Purely vertically and/or horizontally corrections can be performed by using the sets of graduated indicators of this application. Combinations of horizontal, vertical and angular adjustments can be made using the graduated indicators.

Figure 2:
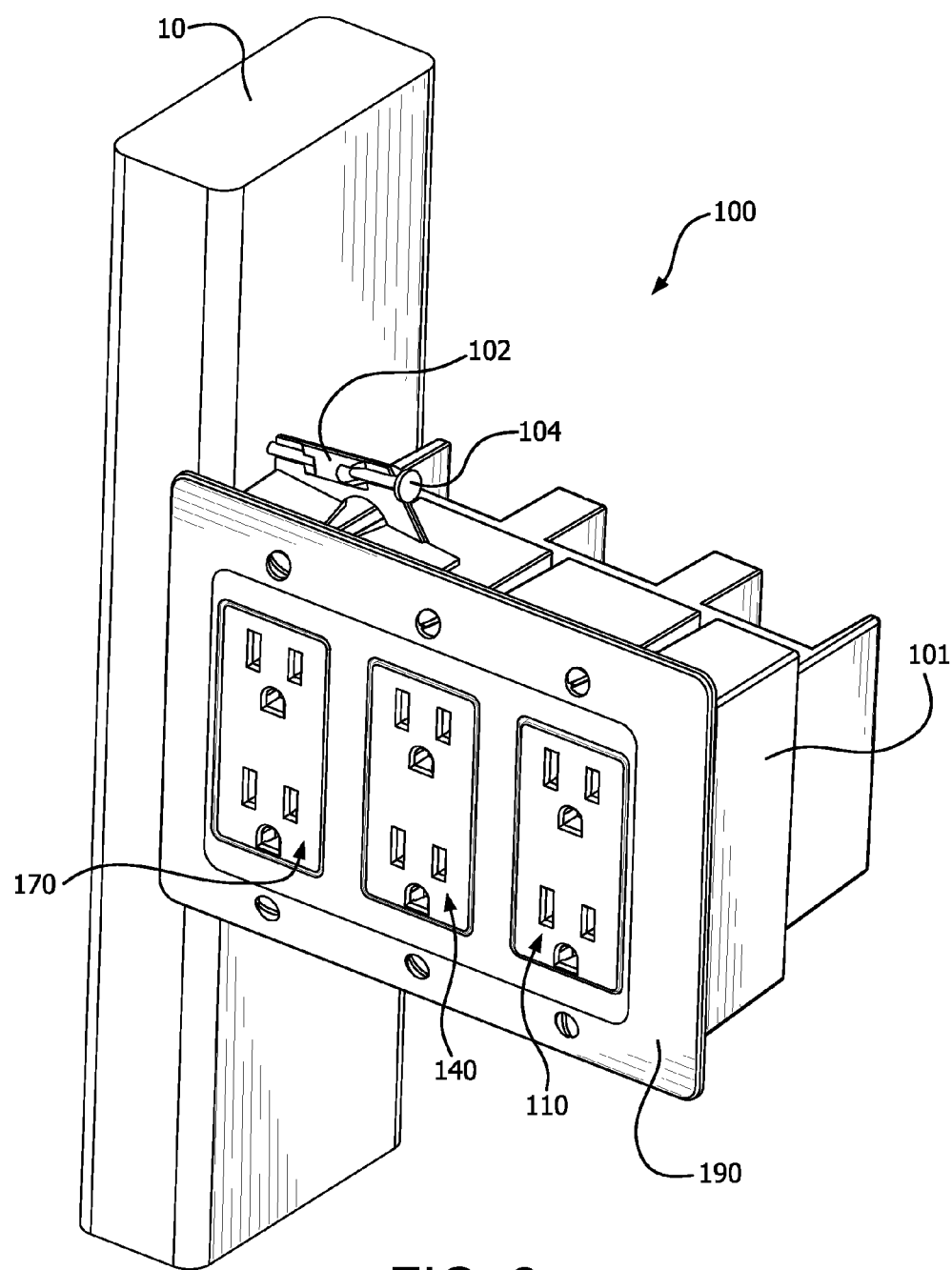
FIG. 2 is a perspective view of a representative electrical device installation according to an illustrative embodiment of the present application.

Referring to FIG. 2, a perspective view of a representative electrical device installation 100 according to an illustrative embodiment of the present application is shown. FIG. 2 shows a view of finished install of the three electrical devices 110, 140, 170 using the graduated indicators. As illustrated, all three of the electrical devices having graduated indicators are now straight vertically in line with the vertical stud in the wall. This provides a proper and attractive installation of the electrical devices in the multi-gang box 101 in the wall with cover 190. As further shown in FIG. 2, the graduated indicators are fully concealed and not visible once the installation is finished.

This apparatus and method will not compromise the structural integrity of the installation or the usability of the device in any way. These graduation lines can be used on any electrical device to be installed singly or to be installed multiply in any multi-gang box whether it is 1, 2, 3 or 4 gang. This apparatus and method can be integrated on any wiring device.

While illustrative embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

I claim:

1. An electrical device comprising:
   a body including one or more electrical receptacles,
   a first mounting yoke operatively connected to the body,
   a first elongated mounting hole in the first mounting yoke for receiving a first fastener in one of at least two different positions,
   wherein the first mounting yoke has two or more first mounting hole position indicators each corresponding to only one of the at least two positions, said indicators positioned near the first elongated mounting hole, further comprising,
   a second mounting yoke operatively connected to the body,
   a second elongated mounting hole in the second mounting yoke for receiving a second fastener in one of at least two positions,
   wherein the second mounting yoke has two or more second mounting hole position indicators each corresponding to one of the at least two positions, said indicators positioned near the second elongated mounting hole, and
   wherein, the two or more first mounting hole position indicators each corresponding to one of the at least two positions, each comprise a vertical line parallel to each other.

2. The electrical component of claim 1, wherein:
   the electrical component comprises a dual 15A outlet.

3. The electrical component of claim 1, wherein:
   the first elongated mounting hole in the first mounting yoke for receiving the first fastener in one of at least three positions,
   wherein the first mounting yoke has three or more first mounting hole position indicators each corresponding to one of the at least three positions, said indicators positioned near the first elongated mounting hole.

4. The electrical component of claim 1, further comprising:
   at least one of the first mounting hole position indicators including an angle indication.

5. The electrical component of claim 1, further comprising:
   at least one of the first mounting hole position indicators including a dimension indication.

6. The electrical component of claim 1, wherein:
   the second elongated mounting hole in the second mounting yoke for receiving the second fastener in one of at least three positions,
   wherein the second mounting yoke has three or more second mounting hole position indicators each corresponding to one of the at least three positions, said indicators positioned near the second elongated mounting hole.

7. The electrical component of claim 1, further comprising:
   at least one of the second mounting hole position indicators including an angle indication.

8. The electrical component of claim 1, further comprising:
   at least one of the second mounting hole position indicators including a dimension indication.

9. An electrical component system comprising:
   a multi-device wall box including,
   a first electrical device including a body including one or more electrical receptacles,
   a first mounting yoke operatively connected to the first electrical device body,
   a first elongated mounting hole in the first mounting yoke for receiving a first fastener in one of at least two different positions, wherein the first mounting yoke has two or more first mounting hole position indicators each corresponding to only one of the at least two positions, said indicators positioned near the first elongated mounting hole, and a second electrical device including a body including one or more electrical receptacles, a second mounting yoke operatively connected to the second electrical device body, a second elongated mounting hole in the second mounting yoke for receiving a second fastener in one of at least two different positions, wherein the second mounting yoke has two or more second mounting hole position indicators each corresponding to only one of the at least two positions, said indicators positioned near the second elongated mounting hole, wherein, the two or more first mounting hole position indicators each comprise a vertical line parallel to each other; and the two or more second mounting hole position indicators each comprise a vertical line parallel to each other.

\* \* \* \* \*